US009399373B2

(12) United States Patent
Duch et al.

(10) Patent No.: US 9,399,373 B2
(45) Date of Patent: Jul. 26, 2016

(54) ARRANGEMENT OF A WHEEL HUB CONNECTED TO A CONSTANT VELOCITY JOINT PROVIDED WITH A SEAL DEVICE

(71) Applicant: Aktiebolaget SKF, Göteborg (SE)

(72) Inventors: Daniele Duch, San Gillio (IT); Fausto Morello, Sommariva del Bosco (IT)

(73) Assignee: AKTIEBOLAGET SKF, Gothenburg (SE)

( * ) Notice: Subject to any disclaimer, the term of this patent is extended or adjusted under 35 U.S.C. 154(b) by 71 days.

(21) Appl. No.: 14/307,679

(22) Filed: Jun. 18, 2014

(65) Prior Publication Data

US 2015/0069825 A1    Mar. 12, 2015

(30) Foreign Application Priority Data

Jun. 19, 2013    (IT) .............................. TO2013A0508

(51) Int. Cl.
| | |
|---|---|
| *B60B 23/00* | (2006.01) |
| *B60B 27/00* | (2006.01) |
| *F16C 33/76* | (2006.01) |
| *F16C 33/78* | (2006.01) |
| *F16C 33/80* | (2006.01) |

(Continued)

(52) U.S. Cl.
CPC .......... *B60B 27/0073* (2013.01); *B60B 27/0036* (2013.01); *F16C 33/583* (2013.01); *F16C 33/768* (2013.01); *F16C 33/7883* (2013.01); *F16C 33/805* (2013.01); *F16C 41/007* (2013.01); *F16C 19/186* (2013.01); *F16C 2326/02* (2013.01); *F16D 1/033* (2013.01); *F16D 2300/08* (2013.01)

(58) Field of Classification Search
CPC ...... B60B 27/00; B60B 7/00; B60B 27/0005; B60B 27/0073; B60B 27/0035
USPC ..................... 301/109, 105.1, 124.1
See application file for complete search history.

(56) References Cited

U.S. PATENT DOCUMENTS 5,674,011 A * 10/1997 Hofmann ............ B60B 27/0005
384/448
6,135,571 A * 10/2000 Mizukoshi .............. B60B 27/00
301/105.1

(Continued)

FOREIGN PATENT DOCUMENTS

DE    102008017409 A1    10/2009
DE    102008050127 A1    4/2010

(Continued)

*Primary Examiner* — Hau Phan
(74) *Attorney, Agent, or Firm* — Bryan Peckjian; SKF USA Inc. Patent Deptl

(57) ABSTRACT

Arrangement including a portion of a radially outer lateral surface of an inner ring of wheel hub having an annular step formed on a constant velocity joint. The step is adapted to receive a first shield, a flange portion that radially extends to protrude towards an outer ring of a wheel hub, in front of a flange portion of a second shield, from a first end of a sleeve portion of the first shield facing on the side opposite of the constant velocity joint and axially protrudes from the inner ring and towards the joint, defining a tubular element arranged straddling wheel hub and an outer ring of the constant velocity joint, having an opposite second end, supporting an annular seal; an annular signal generating insert covers a face of the flange portion, wherein a radially inner annular part of face defines a thrust shoulder for mounting the first shield.

8 Claims, 1 Drawing Sheet

(51) Int. Cl.
  *F16C 41/00* (2006.01)
  *F16C 33/58* (2006.01)
  *F16C 19/18* (2006.01)
  *F16D 1/033* (2006.01)

(56) References Cited

U.S. PATENT DOCUMENTS

| | | | | |
|---|---|---|---|---|
| 6,786,644 | B2* | 9/2004 | Vignotto | F16C 33/7896 384/481 |
| 6,981,800 | B2* | 1/2006 | Shibuya | B60B 27/00 384/544 |
| 7,281,424 | B2* | 10/2007 | Sakamoto | B60B 27/00 384/448 |
| 8,210,752 | B2* | 7/2012 | Kamikawa | F16C 33/768 384/544 |
| 8,591,118 | B2* | 11/2013 | Ishijima | B60B 7/00 301/105.1 |
| 8,616,779 | B2* | 12/2013 | Liu | B60B 27/0026 384/544 |
| 8,757,887 | B2* | 6/2014 | Torii | B60B 27/0005 384/504 |
| 8,944,694 | B2* | 2/2015 | Fukumura | B60B 27/0005 384/544 |

FOREIGN PATENT DOCUMENTS

| | | |
|---|---|---|
| EP | 2042755 A2 | 4/2009 |
| EP | 2043880 A1 | 4/2009 |
| EP | 2541107 A1 | 1/2013 |
| JP | H1193961 A | 4/1999 |
| JP | 2007285374 A | 11/2007 |
| JP | 2009197883 A | 9/2009 |
| JP | 2010023604 A | 2/2010 |
| WO | 2009140996 A1 | 11/2009 |

\* cited by examiner

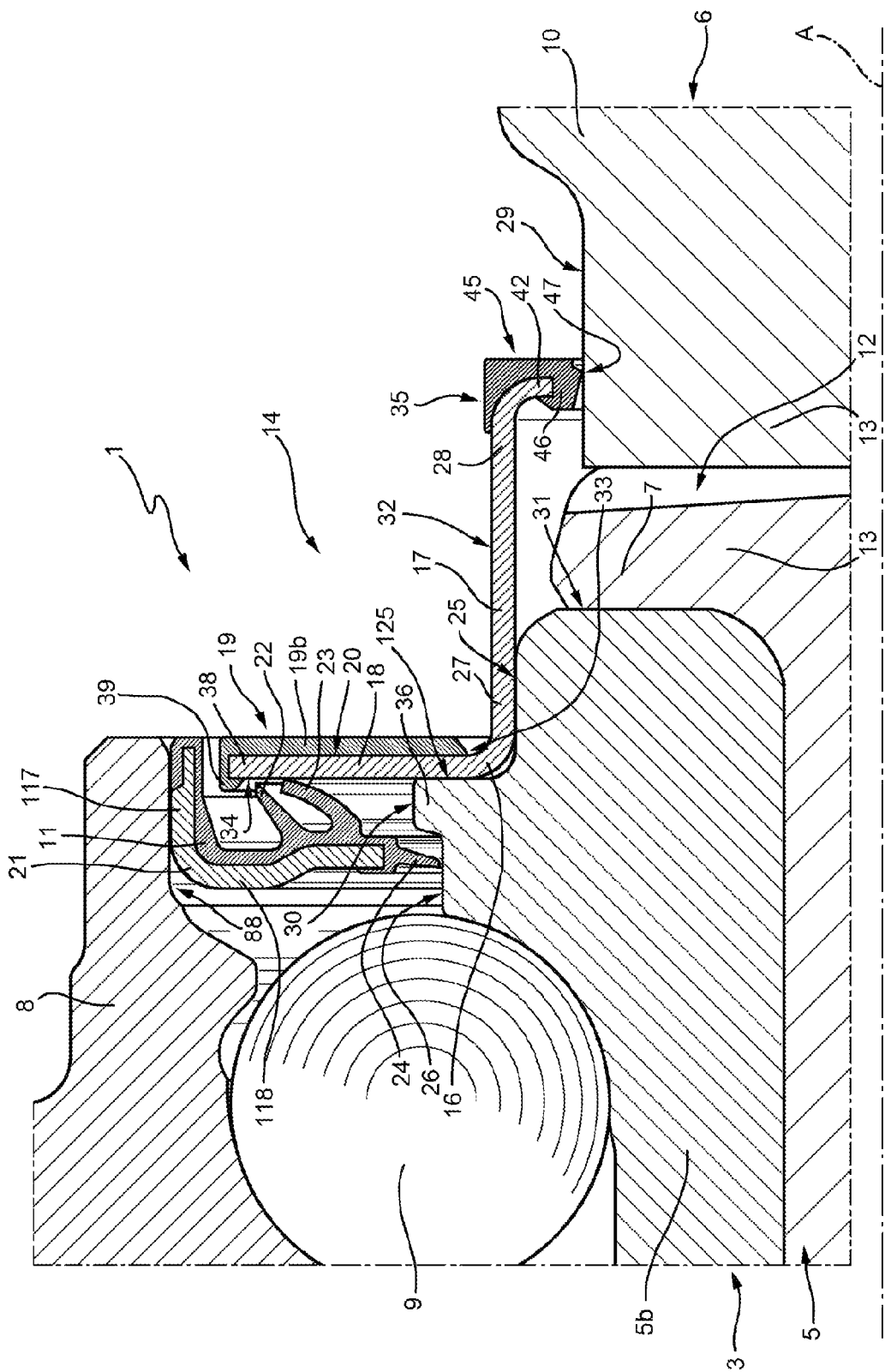

ARRANGEMENT OF A WHEEL HUB CONNECTED TO A CONSTANT VELOCITY JOINT PROVIDED WITH A SEAL DEVICE

CROSS-REFERENCE TO RELATED APPLICATIONS

This application claims priority to Italian Patent Application TO2013A000508 filed on Jun. 19, 2013, the contents of which are herein fully incorporated by reference.

TECHNICAL FIELD OF THE INVENTION

The present invention relates to a seal device for wheel hub assemblies connected to constant velocity joints and to the respective arrangement thereof having a low operating friction and a simplified structure.

BACKGROUND OF THE INVENTION

Wheel hub assemblies, on the one hand, support a vehicle wheel and, if the wheel is a drive wheel, are angularly connected to a related constant velocity joint for the transmission of the driving torque from the axle shaft to the wheel itself. Wheel hub assemblies have an axis of rotation and comprise an inner ring and an outer ring which are coaxial to each other and to the axis of rotation, and are rotatable with respect to each other due to the interposition there-between of two crowns of rolling bodies.

KNOWN ART

The transmission of driving torque from the constant velocity joint to the wheel hub assembly is ensured by conjugated toothed means for transmitting motion, present on the adjacent and facing ends of the wheel hub and of the outer ring of the constant velocity joint; the toothed means may consist of a classical spline coupling, or of a front toothing pair, which couple head to head, as disclosed in WO2009/140996, in EP2042755, or again in EP2043880 (also published as WO2008/006339).

In particular, in the case of front toothings, the joint area between wheel hub and constant velocity joint is to be protected from infiltrations by outside contaminants (water, dust, mud, dirt); the same applies to the rolling bodies mounted interposed between the inner ring and the outer ring, which is provided with the means for securing the suspension to the upright.

Such a protection is obtained according to EP2043880 by means of a single sealing assembly obtained from two opposed shields, a first one fixed on the inner ring, on the side facing the constant velocity joint, and a second one fixed to the outer ring and carrying a sealing ring equipped with one or more sliding lips, which cooperate in contact with the first shield. The first shield has a complex shape made so that a protruding part thereof extends to cover the joint area. This protruding part may be provided, at least at the free end thereof, with an annular sealing seal which cooperates radially with the outer ring of the constant velocity joint; furthermore, the protruding part, or the face of a flange part of the first shield, facing in use the constant velocity joint may be provided with an annular signal generating element (also called "phonic wheel") formed, if the shield is made of ferromagnetic metal material, by alternating inserts and depressions, or by an annular portion made of a magnetizable plastic based material or of an elastomeric compound, magnetized so as to have alternating magnetized and non-magnetized areas, or areas with opposite polarities. Once in use, the rotation of the "phonic wheel", which based on what is said is integral with the inner ring of the bearing, allows the rotation speed of the vehicle wheel to be detected, when coupled to a suitable sensor.

The solution according to EP2043880 is costly, complex to embody, and creates large bulks, especially in axial direction.

A solution is known from EP2541107 by the same Applicant, which brilliantly overcomes all the drawbacks of the known art. Nevertheless, although satisfactory, this solution involves reducing the radial extension of the magnetized rubber element forming the phonic wheel and which is carried by an independent shield restrained integral with the inner ring. On the one hand, the generation may occur in use of a magnetic signal which is not always strong enough, and on the other hand, there is a reduced space, in particular in axial direction, for the sensor, and the presence of several independent sealing assemblies makes mounting more complex.

SUMMARY OF THE INVENTION

It is the object of the present invention to provide a seal device for wheel hub assemblies connected to constant velocity joints which does not have the drawbacks described above, is easy and affordable to embody, has increased protection efficiency of the rolling bodies and of the coupling area between joint and wheel hub, both reduced axial and radial bulks, which leave more space for the sensor, all accompanied by the generation of an ever-strong and reliable magnetic signal, a significant reduction of the friction generated by the sliding of the lips of the seal ring on the first shield, and simplified assembly.

Hence, based on the invention, a seal device is provided for wheel hub assemblies connected to constant velocity joints.

Thereby, a compact assembly structure is obtained of the device, with both reduced axial and radial bulks, which structure is easy to embody and mount, without subjecting the parts with substantial axial length to buckling stresses. An excellent fluid-tight seal is equally obtained of the areas adjacent to the joint and the wheel hub and, at the same time, the generation is ensured by the "phonic wheel" of an ever-reliable magnetic signal, combined with a significant reduction of the friction between the relatively mobile parts in contact of the seal device.

BRIEF DESCRIPTION OF THE DRAWINGS

Further features and advantages of the present invention will become more apparent from the following description of a non-limiting embodiment thereof, which diagrammatically illustrates a longitudinal view in radial section of a seal device according to the invention, applied to a wheel hub assembly connected to a constant velocity joint, which are illustrated only in part for simplicity.

DETAILED DESCRIPTION OF THE INVENTION

With reference to the above-mentioned FIGURE, numeral 1 indicates a seal device as a whole for a wheel hub assembly 3, which inner ring 5 is operatively associated, for rotating integrally thereto, with a constant velocity joint 6, known and therefore illustrated only in part for simplicity. The wheel hub assembly 3 further comprises an outer ring 8 mounted coaxial and concentric with ring 5, radially externally to ring 5, and a plurality of rolling bodies 9 interposed between the rings 5 and 8. The inner ring 5 comprises a ring 5b (insert ring or "SIR"), made as an independent element blocked axially by a rolled edge 7 and delimited externally by an outer cylindrical lateral surface 26, while the constant velocity joint 6 comprises an outer ring 10 (the only part of the constant velocity joint 6 that is shown in the drawing) provided with an outer cylindrical lateral surface 29, arranged normally substantially coaxial to ring 5, and with a toothed coupling 12 with the inner ring 5 having front toothing obtained on reciprocally adjacent portions 13 of edge 7 and of the outer ring 10.

Device 1 comprises a sealing assembly 14 interposed in use between the inner ring 5 (in this case ring 5b) and the outer ring 8 protecting the rolling bodies 9, and also arranged in the way disclosed below, straddling the wheel hub 3 and the outer ring 10 of joint 6, so as to extend straddling the wheel hub 3 and the outer ring 10 of the constant velocity joint to protect the toothed coupling 12.

The sealing assembly 14 comprises: two shields 16 and 21 arranged facing each other and fitted angularly onto the inner ring 5 and inside the outer ring 8, respectively, and an annular sealing element 11, made of an elastomeric material, integrally carried, in the non-limiting embodiment disclosed, by shield 21 and comprising a plurality of annular lips 22, 23, 24.

Shield 16 is L-shaped in radial section and in turn comprises a sleeve portion 17 and a flange portion 18, which radially extends so as to protrude from the exterior from the sleeve portion 17 and towards the outer ring 8.

Shield 21 is also L-shaped in radial section and in turn comprises a sleeve portion 117 anchored angularly integral and fluid-tightly to ring 8, in particular within a front annular seat 88 of the outer ring 8 facing the constant velocity joint 6, and a flange portion 118, which radially extends so as to protrude on the interior of the sleeve portion 117 on the side opposite to the constant velocity joint 6 and towards the inner ring 5.

The flange portion 18, which is arranged in front of the flange portion 118 and within seat 88, supports, towards the outside of seat 88 and joint 6, on a respective front face 20 facing joint 6, a signal generating element 19 (generating a magnetic signal in the example disclosed) defined by a flat annular insert 19b, which has a substantially trapezoidal radial section with constant axial thickness, and is made of a magnetizable elastomeric or plastic synthetic material, which was magnetized and anchored to face 20. The annular insert 19b has a plurality of magnetized and non-magnetized areas alternating about an axis A, or a plurality of magnetized areas with opposite polarity; once the element or annular insert 19b is operatively coupled with a sensor, known and not disclosed, such a sensor transduces the magnetic signal thus providing the rotation speed of ring 5.

Based on what is described, the shields 16 and 21 are anchored by means of respective sleeve portions 17 and 117 thereof, to the inner ring 5 and to the outer ring 8, respectively, of the wheel hub 3 and the respective flange portions 18 and 118 of each shield 16 and 21 extend radially so as to protrude from the sleeve portions 17 and 117 towards the other shield.

According to a first aspect of the invention, the seal device 1 comprises a stretch 30 of the radially outer lateral surface 26 of the inner ring 5 (in this case 5b) on which an annular step 25 is obtained on the side of the constant velocity joint 6 and at an end 31 of the inner ring 5 (in the case disclosed 5b) facing the constant velocity joint 6 shaped so as to be adapted to receive shield 16, as disclosed below.

In combination with the presence of step 25, the flange portion 18 of shield 16 extends radially protruding towards the outer ring 8, in front of the flange portion 118 of shield 21, from a first end 27 of the sleeve portion 17 facing the side opposite to the constant velocity joint 6, so that the flange portion 18 is arranged on the wheel hub 3 on the side opposite to the constant velocity joint 6 and so that shield 16 has accordingly in radial section the shape of an L facing the constant velocity joint 6, as clearly shown in the FIGURE, therefore an extremely simple and linear geometric shape which is easy to obtain by plastic deformation and shearing of a plate, shield 16 being generally made of conveniently treated metal material.

Again, according to the invention and in combination with the presence of step 25 and the specific L-shaped orientation of shield 16, the sleeve portion 17 of shield 16 axially extends so as to protrude from the inner ring 5 (5b) and towards the constant velocity joint 6 and is shaped so as to define a cylindrical tubular element 32 arranged straddling the wheel hub 3 and the outer ring 10 of the constant velocity joint 6, in this case between ring 5b and the outer ring 10.

Furthermore, the "elongated" sleeve portion 17 of shield 16 that defines the tubular element 32 has a second end 28, opposite to end 27, facing the constant velocity joint 6 and which extends over part of surface 29, which end 28 supports an annular seal 35 made of an elastomeric material and which radially extends so as to protrude from end 28, towards the interior of the tubular element 32 defined by the sleeve portion 17, up to intercepting with interference the substantially cylindrical outer lateral surface 29 of the outer ring 10 of the constant velocity joint 6, to exert a radial seal thereon.

Finally, again in accordance with the invention, the annular insert 19b forming the signal generating element 19 is shaped so as to cover substantially the whole of face 20, except, preferably, leaving uncovered a radially inner annular part 33 of face 20, immediately adjacent to end 27 and therefore delimiting a root portion of the flange portion 18, adapted to define/form a thrust shoulder for mounting shield 16 on the annular step 25. Such an annular part 33 would in any event also be adapted to define/form the thrust shoulder for mounting shield 16 on the annular step 25 even if it too were covered by the annular insert 19b.

According to an important aspect of the invention, end 27 of the sleeve portion 17 of shield 16 is fluid-tightly coupled against and on the annular step 25 so that a second face 34 of the flange portion 18, opposite to face 20 and facing on the opposite side of the constant velocity joint 6, cooperates in axial abutment against an axial shoulder 125 facing the constant velocity joint 6 and at least partially defined by the annular step 25.

In this case, and according to a further aspect of the invention, the axial shoulder 125 against which face 34 of the flange portion 18 cooperates in abutment is defined, together, by the annular step 25 and by an annular protrusion 36 obtained on the same stretch 30 of the radially outer lateral surface 26 of the inner ring 5 on which the annular step 25 is obtained. In particular, the annular protrusion 36 is obtained in a position immediately adjacent to, and flush with, the annular step 25 on the opposite side of the constant velocity joint 6 with respect to the annular step 25.

According to a further and complementary aspect of the invention, the annular insert 19b is shaped so as to extend beyond a radially outer edge 38 of the flange portion 18, opposite to the sleeve portion 17, and towards shield 21, in a position immediately facing, but spaced apart from, the sleeve portion 117 of shield 21, so as to form an annular buttress 39 arranged facing the flange portion 118 towards which the annular buttress 39 axially extends so as to protrude from the flange portion 18 and into which the annular buttress 39 of edge 38 is entirely embedded.

The first annular lip 22 of the annular sealing element 11 extends so as to protrude in a position immediately adjacent to buttress 39, between buttress 39 and the inner ring 5 (5b), so as to cooperate, without sliding, with the flange portion 18 and with buttress 39 to define a labyrinth seal between the shields 16, 21 and on the side of the sleeve portion 117.

As already apparent in the non-limiting embodiment disclosed and in any event preferred, the annular sealing element 11 is integrally carried by the flange portion 118 of shield 21, which radially extends so as to protrude from the sleeve portion 117 on the side opposite to the constant velocity joint 6 and towards the inner ring 5 of the wheel hub 3; the annular lip 22 extends in radial direction obliquely protruding from the flange portion 118 and towards the sleeve portion 117 partially within an axial bulk of buttress 39, but in a position radially offset towards ring 5 with respect to the radial position of buttress 39; in any case, lip 22 is radially interposed between buttress 39 and the inner ring 5/5b.

The annular sealing element 11 further comprises at least a second annular lip 23 and a third annular lip 24, which extend so as to protrude from the flange portion 118 in diverging directions, lip 23 to cooperate in sliding manner and with slight interference, with the flange portion 18, and lip 24 preferably by forming a labyrinth seal towards the inner ring 5/5b, respectively, which extends therefore, in the example disclosed, up to being close to surface 26, but without touching it, i.e. it cooperates with predetermined radial clearance with surface 26, in this case immediately upstream of protrusion 36 with reference to the related position of protrusion 36 with respect to the constant velocity joint 6. To increase the seal action, when needed, lip 24 could in any case be made so as to also cooperate in sliding manner and with slight interference with surface 26.

According to another aspect of the invention, end 28 is provided, radially on the interior, with an L-shaped edge 42 on the opposite side of a radially protruding direction of extension of the flange portion 18, i.e. towards the inside of the tubular element 32 defined by the sleeve portion 17; the L-shaped edge 42 has a significantly larger radial extension that the one of the uncovered annular part 33 of face 20 and is entirely embedded into the annular seal 35; the L-shaped edge 42 is further adapted to define a second thrust shoulder for mounting shield 16 on the annular step 25 obtained towards the constant velocity joint 6 on stretch 30 of radially outer surface 26 of the inner ring 5/5b.

The radial extension of step 25 serves to provide rigidity to shield 16 after driving. The axial extension of step 25 is made larger (equal to just less than half the axial distance in use between end 31 and the rolling bodies 9) so as to ensure ample space for accommodating the sensor adapted to cooperate in use with the signal generating element 19.

The annular seal 35 is formed by a block of elastomeric material, in the non-limiting embodiment disclosed axially delimited towards the constant velocity joint 6, by a flat face 45 arranged parallel to the L-shaped edge 42, and at least in part (for more than two thirds of the radial extension thereof in the embodiment disclosed) flanked by the L-shaped edge 42 on the opposite side of the constant velocity joint 6.

Radially, on the side facing in use surface 29, the elastomeric block defining seal 35 is delimited by an annular sealing lip 46, which directly cooperates against the substantially cylindrical outer lateral surface 29 of the outer ring 10 of the constant velocity joint 6 and which has a saw-tooth shape in radial section having the vertex 47 facing the constant velocity joint 6.

It is apparent from what is described that due to the synergetic combination of the different features described, and especially to the presence of step 25, an arrangement is obtained of wheel hub 3 guided by a constant velocity joint 6 in which there is more space for the signal generating element 19, thus ensuring the generation of a magnetic signal which is always strong and reliable and, at the same time, a drastic reduction of the friction generated by the seal device 1, as well as a reduction and simplification of the components of the seal device, which reduces mounting times and production costs, reduced standard axial and radial bulks of EP2541107 being the same.

The invention claimed is:

1. An arrangement of a wheel hub connected to a constant velocity joint provided with a seal device, comprising:
    a sealing assembly disposed between an inner ring and an outer ring of the wheel hub, the sealing assembly extends straddling between the wheel hub and an outer ring of the constant velocity joint; wherein:
    the sealing assembly comprises a first shield and a second shield anchored by a first sleeve portion and a second sleeve portion, respectively, to the inner ring and to the outer ring of the wheel hub, respectively, and each having a respective flange portion which radially extends protruding from the sleeve portion and towards the second shield, and an annular sealing element carried by one of the first shield and the second shield provided with a plurality of annular sealing lips which cooperate with the second shield; the flange portion of the first shield carrying a signal generating element on the outer side thereof and towards the constant velocity joint consisting of an annular insert, wherein,
        i) the seal device comprising a portion of a radially outer lateral surface of the inner ring, an annular step formed on side of the portion of the radially outer lateral surface of the inner ring located proximate the constant velocity joint and at an end of the inner ring facing the constant velocity joint, the annular step being adapted to receive the first shield;
        ii) the flange portion of the first shield extends radially overhangingly towards the outer ring and in front of the flange portion of the second shield, from a first end of the sleeve portion facing the side opposite to the constant velocity joint, wherein the flange portion of the first shield is arranged on the wheel hub on the side of the second sleeve portion located opposite of the constant velocity joint and wherein the first shield has in radial section the shape of an L facing the constant velocity joint;
        iii) the sleeve portion of the first shield overhangingly axially extends from the inner ring and towards the constant velocity joint, the sleeve portion being shaped to define a cylindrical tubular element arranged straddling the wheel hub and the outer ring of the constant velocity joint, the sleeve portion having a second end, opposite to the first end and facing the constant velocity joint, supporting an annular seal made of an elastomeric material and which radially extends protruding from the second end of the sleeve portion of the first shield, towards the inside of the tubular element defined by the sleeve portion of the first shield, up to intercept with interference a substantially cylindrical outer lateral surface of the outer ring of the constant velocity joint, for exerting a radial seal on it;
        iv) the annular insert forming the signal generating element, the annular insert being implemented as an annular insert having a predetermined thickness, measured in an axial direction, of one of a magnetizable elastomeric or a plastic synthetic material, the annular insert being chemically anchored to a first face of the flange portion of the first shield facing the constant velocity joint, and the annular insert being shaped wherein a radially inner annular part of the first face, immediately adjacent to the first end of the sleeve portion of the first shield is adapted to define a first thrust shoulder for mounting the first shield on the annular step; the annular insert extending to cover the first face, leaving uncovered the annular part constituting the first thrust shoulder, v) the first end of the sleeve portion of the first shield is fluid-tightly coupled against and on the annular step of the radially outer lateral surface of the inner ring wherein a second face of the flange portion of the first shield, opposite to the first face and facing an opposing side of the constant velocity joint, cooperates in axial abutment against an axial shoulder facing the constant velocity joint and at least partially defined by the annular step; and vi) the axial shoulder, against which the second face of the flange portion of the first shield cooperates in abutment is defined by the annular step and by an annular protrusion formed on the same portion of the radially outer lateral surface of the inner ring as the annular step is formed, the annular protrusion being formed in a position immediately adjacent to the annular step and flush with the annular step on an opposing side of the constant velocity joint with respect to the annular step.

2. The arrangement according to claim 1, wherein the annular insert is shaped to extend beyond a radially outer edge of the flange portion of the first shield opposite to the sleeve portion of the first shield and towards the second shield, in a position immediately facing, but spaced apart from, the sleeve portion of the second shield, to form an annular buttress arranged facing the flange portion of the second shield, the annular buttress axially extending towards the flange portion of the second shield, the annular buttress protruding from the flange portion of the first shield.

3. The arrangement according to claim 2, the annular sealing element further comprising at least a first annular lip that extends protruding in a position immediately adjacent to the buttress of the annular insert and between the buttress of the annular insert and the inner ring, to cooperate without sliding with the flange portion of one of the first shield and the second shield and with the buttress of the annular insert for defining a labyrinth seal between the first shield and the second and on the side of the sleeve portion of the second shield.

4. The arrangement according to claim 1, wherein the annular sealing element is integrally supported by the flange portion of the second shield, the flange portion of the second shield radially extends protruding from the sleeve portion of the second shield on the side opposite to the constant velocity joint and towards the inner ring of the wheel hub; the first annular lip extends in radial direction obliquely protruding from the flange portion of the second shield and towards the sleeve portion of the second shield partially within an axial bulk of the buttress of the annular insert, to be radially disposed between the buttress and the inner ring.

5. The arrangement according to claim 4, the annular sealing element of the first sealing assembly further comprising at least one of a second annular lip and a third annular lip, wherein the at least one of the second annular lip and the third annular lip extend protruding from the flange portion of the second shield in diverging directions for cooperating, the second annular lip by sliding with the flange portion of the first shield, and the third annular lip, providing a labyrinth seal towards the inner ring.

6. The arrangement according to claim 5, wherein the second end of the sleeve portion of the first shield is radially provided on the inside with an L-shaped edge on an opposing side with respect to a radial protruding extension direction of the flange portion of the first shield;

the L-shaped edge of the second end of the sleeve portion of the first shield being wholly embedded in the annular seal and being adapted to define a second thrust shoulder for mounting the first shield on the annular step obtained towards the constant velocity joint on the stretch of a radially outer surface of the inner ring.

7. The arrangement according to claim 6, wherein the annular seal is formed by a block of elastomeric material axially delimited towards the constant velocity joint by a flat face arranged parallel to the L-shaped edge of the second end of the sleeve portion of the first shield and at least partially flanked by it on an opposing side with respect to the constant velocity joint and radially by a fourth annular sealing lip, wherein the fourth annular sealing lip directly cooperates against the substantially cylindrical outer lateral surface of the outer ring of the constant velocity joint, wherein the fourth annular sealing lip has a saw-tooth shape in radial section having the vertex facing the constant velocity joint.

8. The arrangement according to claim 4, the annular sealing element of the first sealing assembly further comprising at least one of a second annular lip and a third annular lip, wherein the at least one of a second annular lip and a third annular lip extend protruding from the flange portion of the second shield in diverging directions for cooperating, the second annular lip by sliding with the flange portion of the first shield, and the third annular lip, not providing a labyrinth seal towards the inner ring.

* * * * *